US012303926B2

(12) United States Patent
Ruminski et al.

(10) Patent No.: US 12,303,926 B2
(45) Date of Patent: May 20, 2025

(54) MULTI-COMPONENT ELECTRO-MECHANICAL FLAME SPRAY DEPOSITION SYSTEM

(71) Applicant: Kennametal Inc., Latrobe, PA (US)

(72) Inventors: Andrew Ruminski, Natrona Heights, PA (US); Qingjun Zheng, Export, PA (US); Jacob Poremski, Apollo, PA (US); Jerry Dean, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 116 days.

(21) Appl. No.: 18/158,243

(22) Filed: Jan. 23, 2025

(65) Prior Publication Data

US 2024/0246100 A1 Jul. 25, 2024

(51) Int. Cl.
*B05B 7/20* (2006.01)
*B05B 7/14* (2006.01)

(52) U.S. Cl.
CPC ............ *B05B 7/206* (2013.01); *B05B 7/1463* (2013.01); *B05B 7/1486* (2013.01)

(58) Field of Classification Search
CPC ........................................................ B05B 7/20
See application file for complete search history.

(56) References Cited

U.S. PATENT DOCUMENTS 2,900,138 A 8/1959 Strate
3,096,199 A 7/1963 Kenneth
3,995,811 A 12/1976 Broderick et al.
4,519,541 A 5/1985 Rotolico
4,576,526 A * 3/1986 Muller .................. B05B 7/1463 406/75
4,801,210 A * 1/1989 Gian ....................... B01F 33/80 366/182.1
5,544,811 A * 8/1996 Tillery .................... B05B 7/205 239/85
2010/0151124 A1 6/2010 Xue et al.
2015/0255778 A1* 9/2015 Orisaka ..................... B05C 9/12 29/746

FOREIGN PATENT DOCUMENTS

CA 1081939 7/1980
CN 105171214 A 12/2015
(Continued)

OTHER PUBLICATIONS

Kennametal Inc., Kennametal Stellite KK2 Powder Feeder Operations Maintenance with Parts List, Rev. C, 05, 2020.
(Continued)

*Primary Examiner* — Austin Murata
(74) *Attorney, Agent, or Firm* — Christopher J. Owens

(57) ABSTRACT

A multi-component electro-mechanical flame spray deposition system is disclosed having a first electro-mechanical feeder and a second electro-mechanical feeder, each in communication with a mixing hopper, and wherein the mixing hopper is in communication with a powder nozzle having an orifice, and a combustion torch having an orifice, wherein the orifice of the powder nozzle is in juxtaposition to the orifice of the combustion torch. A method of using the multi-component electro-mechanical flame spray deposition system is provided for depositing substrates on or to articles of manufacture.

15 Claims, 10 Drawing Sheets

(56) References Cited

FOREIGN PATENT DOCUMENTS

| | | | |
|---|---|---|---|
| CN | 106637044 | A | 5/2017 |
| CN | 108746959 | A | 11/2018 |
| CN | 110977122 | A | 4/2020 |
| CN | 113814543 | A | 12/2021 |
| CN | 216682829 | U | 6/2022 |
| EP | 0253177 | | 1/1988 |
| GB | 958510 | | 5/1964 |

OTHER PUBLICATIONS

Kennametal, Inc., Wear Solution Technology Bulletin: NiCAR Hardfacing Rods, 2021.
Liu W., et al., "Microstructure and Wear of Ni-WC Hardfacing Used for Steel-Body PDC Bits," International Journal of Refractory Metals and Hard Materials, 2021, vol. 101, pp. 1-11, Retrieved from the Internet: URL: https://doi.org/10.1016/j.ijrmhm.2021.105683.
"Plasma Transferred Arc (PTA)," Starweld™, 16 Pages.

* cited by examiner

MULTI-COMPONENT ELECTRO-MECHANICAL FLAME SPRAY DEPOSITION SYSTEM

CROSS-REFERENCE TO RELATED APPLICATION

Not applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a multi-component electro-mechanical flame spray deposition system. The multi-component electro-mechanical flame spray deposition system of this invention, in certain embodiments, may be used to coat steel body drill bits, among other articles of manufacturing. The present invention provides a method of providing a hard facing to steel body drill bits. The system of the present invention is conducive to automation and is capable safely depositing uniform composites consisting of large carbides, small carbides and nickel alloy powders to an article of manufacture, such as for example, but not limited to a steel body drill bit. A method is provided employing the multi-component electro-mechanical flame spray deposition system of this invention for applying a wear coating with abrasion and erosion resistance to an article of manufacture.

2. Description of the Background Art

Flame spraying is a thermal spray technique which has existed for more than a century. Despite its maturity, flame spraying is still a salient technology particularly in wear coating applications. The continued relevance of flame spraying is due in large part the versatility and simplicity of the technique. This technique continues to have critical applications in petroleum well drilling applications. Steel body drills used in the petroleum industry have complex geometries and require composite wear coatings containing mixtures of materials that have large disparities in density and particle size.

Some of the more advanced hardfacing technologies are not good alternatives for coating steel body drill bits. Techniques requiring tightly controlled standoffs to maintain arc stability are not good fits for this application. These techniques include plasma transferred arc (PTA) and arc welding of wires. Due to the large carbide particle size needed for good abrasion resistance in petroleum drilling applications (>300 micron), hardfacing technologies limited to fine powders (<50 microns) are not feasible. This excludes laser cladding, high velocity oxy-fuel (HVOF), and cold spray deposition. Outside of the aforementioned technologies, combustion-based technologies (oxy-acetylene welding) appear to be the only currently viable technologies for coating steel body drill bits.

The two (2) viable techniques include flame spray and brazing. Brazing typically includes using an oxy-acetylene torch to heat the substrate and melt rods or rope containing mixtures of nickel alloys and carbides onto the surface. Unfortunately, brazing is a manual process which does not lend well to automation. In addition, brazing steel body drill bits successfully requires considerable operator skill. Given current skilled labor shortages, replacing such processes with something that could be automated is highly desirable.

Flame spraying is the only currently viable technology which could be used to apply hard facing to steel body drill bits with an automated process. Additionally, manual flame spraying is also a lower skill technique that would allow for less experienced operators to achieve proficiency more rapidly than brazing. At present, there are some gaps in flame spray technology that could prevent replacing brazing with flame spray. These include: 1) no commercially available system for depositing carbide particle larger than 400 micrometers and 2) the tendency for large carbides and small alloys to extensively segregate after mixing resulting in coatings with highly variable and oftentimes unacceptable performance.

Contemporary, commercially available flame spray systems have only one powder feed. This necessitates dispensing flame spray powders in small batches, approximately 0.45 kg, and mixing them immediately prior to deposition. Such an arrangement is not conducive to automation and successful application hinges on constant attention to detail on the part of the operator. In addition to the single feed, many common flame spray systems mix the powder inside the same nozzle with the combustion gases. While this practice may increase deposition efficiency and coating efficacy, it is also hazardous to attempt to mix combustible gases with large carbide particles. Such a practice has resulted in the explosion of flame spray torches which could result in serious injury of the operator.

Thus, there is an unmet need to provide a multi-component electro-mechanical flame spray deposition system that applies a wear coating with abrasion and erosion resistance equal to or better than a brazed rod/rope that does not require a very high level of operator expertise, or that may be automated.

SUMMARY OF THE INVENTION

A multi-component electro-mechanical flame spray deposition system is provided.

In certain embodiments of this invention, a multi-component electro-mechanical flame spray deposition system is disclosed having a first electro-mechanical feeder and a second electro-mechanical feeder, each in communication with a mixing hopper, and wherein the mixing hopper is in communication with a powder nozzle having an orifice, and a combustion torch having an orifice, wherein the orifice of the powder nozzle is in juxtaposition to the orifice of the combustion torch.

In one embodiment of this invention, a multi-component electro-mechanical flame spray deposition system is provided comprising a first electro-mechanical feeder and a second electro-mechanical feeder, a first metering wheel located within said first electro-mechanical feeder, a first feeder tube and wherein said first electro-mechanical feeder is in communication with said first feeder tube, and wherein said second electro-mechanical feeder, a second metering wheel that is located within said second electro-mechanical feeder, a second feeder tube and wherein the second electro-mechanical feeder is in communication with the second feeder tube, a mixing hopper that is located in juxtaposition to said first electro-mechanical feeder and said second electro-mechanical feeder, and wherein said mixing hopper has a bottom plenum, and wherein said bottom plenum of said mixing hopper has an orifice, and wherein said first feeder tube is in communication with said mixing hopper, and wherein said second feeder tube is in communication with said mixing hopper, a powder nozzle and wherein said powder nozzle is in communication with said orifice of said bottom plenum of said mixing hopper, and wherein said powder nozzle has an orifice, and a combustion torch having a combustion chamber and a tube port wherein said tube port is in communication with said combustion chamber of said combustion torch, and wherein said tube port of said combustion torch has an orifice, and whereon said orifice of said tube port of the combustion torch is in juxtaposition to said orifice of said powder nozzle.

In another embodiment of this invention, a multi-component electro-mechanical flame spray deposition system is provided comprising a first electro-mechanical feeder and a second electro-mechanical feeder, wherein said first electro-mechanical feeder has a first electro-mechanical feeder enclosed space and a first electro-mechanical feeder opening, and wherein said first electro-mechanical feeder opening is covered by a first removable sealable lid, and a first metering wheel located in said first electro-mechanical feeder enclosed space, and wherein said first metering wheel is rotatably driven by a first motor, and a first feeder tube and wherein said first electro-mechanical feeder is in communication with said first feeder tube, and wherein said second electro-mechanical feeder has a second electromechanical feeder enclosed space and a second electro-mechanical feeder opening, and wherein said second electro-mechanical feeder opening is covered by a second removable sealable lid, and a second metering wheel that is located in said second electro-mechanical feeder enclosed space, and wherein the second metering wheel is rotatably driven by a second motor, and a second feeder tube and wherein the second electro-mechanical feeder is in communication with the second feeder tube, a mixing hopper that is located in juxtaposition to said first electro-mechanical feeder and said second electro-mechanical feeder, and wherein said mixing hopper has a bottom plenum, and wherein said bottom plenum of said mixing hopper has an orifice, and wherein said first feeder tube is in communication with said mixing hopper, and wherein said second feeder tube is in communication with said mixing hopper, a powder nozzle and wherein said powder nozzle is in communication with said orifice of said bottom plenum of said mixing hopper, and wherein said powder nozzle has an orifice, and a combustion torch having a combustion chamber and a tube port wherein said tube port is in communication with said combustion chamber of said combustion torch, and wherein said tube port of said combustion torch has an orifice, and wherein said orifice of said tube port of the combustion torch is in juxtaposition to said orifice of said powder nozzle.

In another embodiment of this invention, a multicomponent electro-mechanical flame spray deposition system is provided as described herein, wherein said orifice of said tube port of said combustion torch is positioned at an oblique angle to said orifice of said powder nozzle.

In another embodiment of this invention, a multi-component electro-mechanical flame spray deposition system is provided as described hereon, wherein said orifice of said tube port of said combustion torch is positioned at an acute angle to said orifice of said powder nozzle.

In another embodiment of this invention, a multi-component electro-mechanical flame spray deposition system is provided as described herein, wherein there is a tolerance gap between said orifice of said powder nozzle and said orifice of said tube port of said combustion torch that ranges from about one eighth inch to about one inch.

In another embodiment of this invention, a multicomponent electro-mechanical flame spray deposition system is provided as described herein including a handle assembly attached to said combustion torch and said powder nozzle.

In another embodiment of this invention, a multicomponent electro-mechanical flame spray deposition system is provided as described herein including a multi-positional gantry and wherein said multi-component electro-mechanical flame spray deposition system is attached to said multi-positional gantry.

Another embodiment of this invention provides a method of depositing substrates on or to articles of manufacture comprising providing a multi-component electro-mechanical flame spray deposition system comprising a first electro-mechanical feeder and a second electro-mechanical feeder, wherein said first electro-mechanical feeder has a first electro-mechanical feeder enclosed space and a first electro-mechanical feeder opening, and wherein said first electro-mechanical feeder opening is covered by a first removable sealable lid, and a first metering wheel located in said first electro-mechanical feeder enclosed space, and wherein said first metering wheel is rotatably driven by a first motor, and a first feeder tube and wherein said first electro-mechanical feeder is in communication with said first feeder tube, and wherein said second electro-mechanical feeder has a second electromechanical feeder enclosed space and a second electro-mechanical feeder opening, and wherein said second electro-mechanical feeder opening is covered by a second removable sealable lid, and a second metering wheel that is located in said second electro-mechanical feeder enclosed space, and wherein the second metering wheel is rotatably driven by a second motor, and a second feeder tube and wherein the second electro-mechanical feeder is in communication with the second feeder tube, a mixing hopper that is located in juxtaposition to said first electro-mechanical feeder and said second electro-mechanical feeder, and wherein said mixing hopper has a bottom plenum, and wherein said bottom plenum of said mixing hopper has an orifice, and wherein said first feeder tube is in communication with said mixing hopper, and wherein said second feeder tube is in communication with said mixing hopper, a powder nozzle and wherein said powder nozzle is in communication with said orifice of said bottom plenum of said mixing hopper, and wherein said powder nozzle has an orifice, and a combustion torch having a combustion chamber and a tube port wherein said tube port is in communication with said combustion chamber of said combustion torch, and wherein said tube port of said combustion torch has an orifice, and whereon said orifice of said tube port of the combustion torch is in juxtaposition to said orifice of said powder nozzle, and optionally said multi-component electro-mechanical flame spray deposition system includes an inlet positioned into said mixing hopper for gas pressurization of said mixing hopper and said powder nozzle, a first pressure release valve positioned on said first electro-mechanical feeder and a second pressure relief valve positioned on said second electro-mechanical feeder, volumetrically dispensing from said first electro-mechanical feeder and said second electro-mechanical feeder one or more of a hardfacing composite materials by activating said first metering wheel by said first motor and activating said second metering wheel by said second motor, providing a flow of said hardfacing composite materials through said first feeder tube and through said second feeder tube and into said mixer hopper and through said orifice of said powder nozzle, providing a flame exiting through said orifice of said tube port of said combustion torch, and providing for an exit of said hardfacing composite materials from said orifice of said second end of said powder nozzle, entraining said hardfacing composite materials from said orifice of said second end of said of said powder nozzle into a flame exciting said orifice of said combustion torch for forming a liquid hardfacing composite material, and depositing said liquid hardfacing composite material onto an article of manufacture.

In certain other embodiments of the multi-component electro-mechanical flame spray deposition system of this invention, as described herein, the second electro-mechanical feeder is substituted by a feeder that is selected from one of the group consisting of a gravity feeder and a gas injection feeder.

These and other embodiments of this invention shall be described in more detail and in the drawings that show certain embodiments of this invention.

BRIEF DESCRIPTION OF THE DRAWINGS

While various embodiments of this invention are illustrated in the drawings, the particular embodiments shown should not be construed to limit the claims. Various modifications and changes may be made without departing from the scope of the invention.

FIG. 2 shows on the right, a top view of the first metering wheel, or the second metering wheel of the multi-component electro-mechanical flame spray deposition system of this invention.

FIG. 4 shows on the top right an isometric view of the bottom plenum of the mixing hopper. FIG. 4 shows on the bottom left a cross-sectional view of the bottom plenum of the mixing hopper. FIG. 4 shows on the bottom right a side view of the bottom plenum of the mixing hopper of the multi-component electro-mechanical flame spray deposition system of this invention.

FIG. 5 shows on the bottom left a perspective view of the handle assembly with clamp. FIG. 5 shows on the bottom right a perspective view of the handle assembly with clamp of the multi-component electro-mechanical flame spray deposition system of this invention.

FIG. 6A shows on the top right a top view of the optional heat shield, and mixing hopper, handle assembly, and combustion torch of this invention. FIG. 6A shows on the bottom left an isometric view of the optional heat shield, and mixing hopper, handle assembly, powder nozzle, and combustion torch of this invention. FIG. 6A shows on the bottom right an isometric view of the optional heat shield, and mixing hopper, handle assembly, powder nozzle, and combustion torch of this invention.

FIG. 6B shows on the top right a top view of the multi-positional gantry and the multi-component electro-mechanical flame spray deposition system of this invention. FIG. 6B shows on the bottom left a perspective view of the multi-positional gantry and the multi-component electro-mechanical flame spray deposition system of this invention. FIG. 6B shows on the bottom right a perspective view of multi-positional gantry and the multi-component electro-mechanical flame spray deposition system of this invention.

DETAILED DESCRIPTION OF THE INVENTION

Figure 1A:
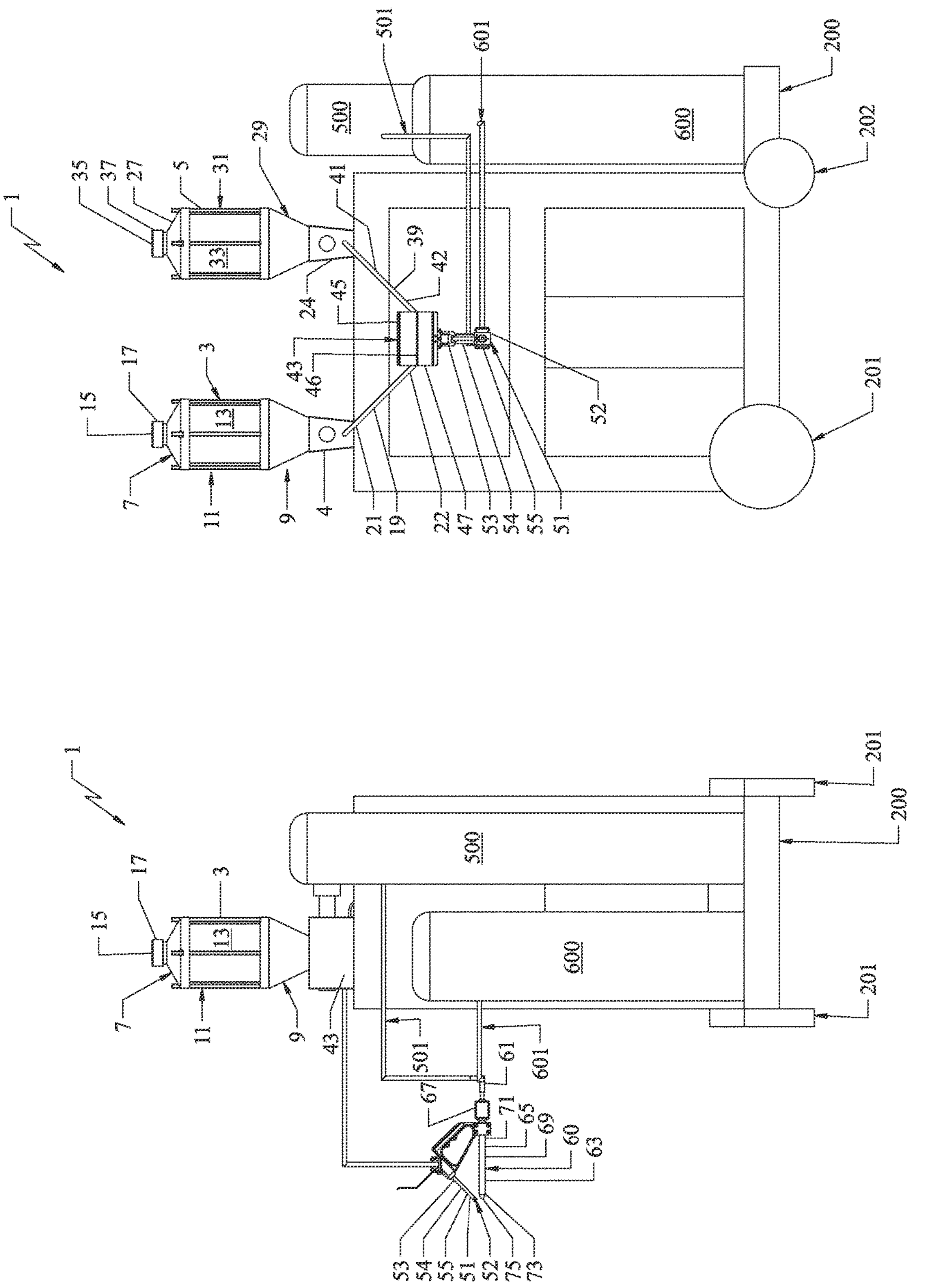
FIG. 1A shows, on the left, a side view of the multi-component electro-mechanical flame spray deposition system of this invention, and FIG. 1A, on the right shows, a front view of the multi-component electro-mechanical flame spray deposition system of this invention.
Figure 1B:
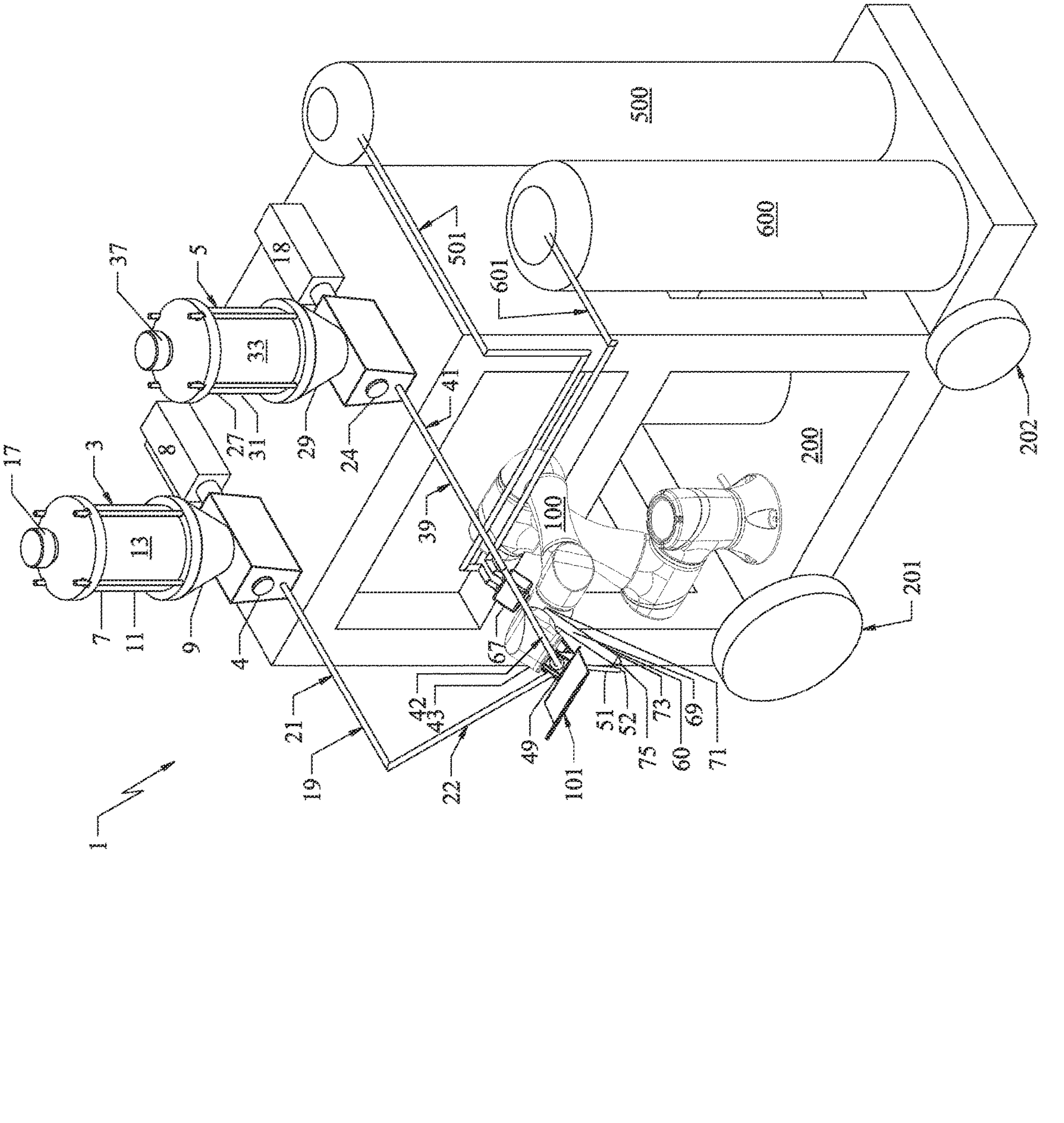
FIG. 1B shows a perspective view of the multi-component electro-mechanical flame spray deposition system of this invention.
Figure 2:
FIG. 2 shows on the left, a side view of the first metering wheel, or the second metering wheel of the of the multi-component electro-mechanical flame spray deposition system of this invention.

FIGS. 1A, 1B, 3A, 3B, 3C, 4, 5, 6A, and 6B illustrate a multi-component electro-mechanical flame spray deposition system having a first electro-mechanical feeder (3) and a second electro-mechanical feeder (5), each in communication with a mixing hopper (43), and wherein the mixing hopper (43) is in communication with a powder nozzle (51) having an orifice (50), and a combustion torch (60) having an orifice (75), wherein the orifice (50) of the powder nozzle (51) is in juxtaposition to the orifice (75) of the combustion torch (60).

FIGS. 1A, 1B, 2, 3A, 3B, 3C, 4, 5, 6A, and 6B illustrate a multi-component electro-mechanical flame spray deposition system (1) comprising a first electro-mechanical feeder (3) and a second electro-mechanical feeder (5), wherein the first electro-mechanical feeder (3) has an enclosed space (13) and an opening (15), and wherein said opening (15) is covered by a first removable sealable lid (17), and a first metering wheel (4) located in the enclosed space (13), and wherein the first metering wheel (4) is rotatably driven by a first motor (8), and a first feeder tube (19) and wherein the electro-mechanical feeder (3) is in communication with the first feeder tube (19), and wherein the second electro-mechanical feeder (5) has an enclosed space (33) and an opening (35), and wherein said opening (35) is covered by a second removable sealable lid (37), and a second metering wheel (24) that is located in the enclosed space (33), and wherein the second metering wheel (24) is rotatably driven by a second motor (18), and a second feeder tube (39) and wherein the second electro-mechanical feeder (5) is in communication with the second feeder tube (39), a mixing hopper (43) that is located in juxtaposition to the first electro-mechanical feeder (3) and the second electro-mechanical feeder (5), and wherein the mixing hopper (43) has a bottom plenum (49), and wherein the bottom plenum (49) of the mixing hopper (43) has a first inlet (800) and a second inlet (801) and an orifice (50) that is in communication with the first inlet (800) and the second inlet (801), and wherein the first feeder tube (19) is in communication with the first inlet (800) of the mixing hopper (43), and wherein the second feeder tube (39) is in communication with the second inlet (801) of the mixing hopper (43), a powder nozzle (51) and wherein the powder nozzle (51) is in communication with the orifice (50) of the bottom plenum (49) of the mixing hopper (43), and wherein the powder nozzle (51) has an orifice (52), and a combustion torch (60) having a combustion chamber (67) and a tube port (69) wherein the tube port (69) is in communication with the combustion chamber (67) of the combustion torch (60) and wherein the tube port (69) of the combustion torch (60) has an orifice (75), and whereon the orifice (75) of the tube port (69) of the combustion torch (60) is in juxtaposition to the orifice (52) of the powder nozzle (51).

In certain other embodiments of this invention, FIGS. 1A, 1B, 2, 3A, 3B, 3C, 4, 5, 6A, and 6B illustrate a multi-component electro-mechanical flame spray deposition system (1) comprising a first electro-mechanical feeder (3) and a second electro-mechanical feeder (5), wherein the first electro-mechanical feeder (3) has a first end (7) and a second end (9) that is opposite to the first end (7), and a middle section (11) that is disposed between said first end (7) and said second end (9) of said first electro-mechanical feeder (3), and wherein said first end (7), said middle section (11), and the second end (9) form an enclosed space (13), and wherein the first end (7) of the electro-mechanical feeder (3) has an opening (15), and wherein said opening (15) is covered by a first removable sealable lid (17), and a first metering wheel (4) located in the enclosed space (13), and wherein the first metering wheel (4) is rotatably driven by a first motor (8), and a first feeder tube (19) having a first end (21) and a second end (22) that is opposite to the first end (21) of the first feeder tube (19), and wherein the second end (9) of the electro-mechanical feeder (3) is in communication with the first end (21) of the first feeder tube (19), and wherein the second electro-mechanical feeder (5) has a first end (27) and a second end (29) that is opposite to the first end (27), and a middle section (31) that is disposed between said first end (27) and said second end (29) of said second electro-mechanical feeder (5), and wherein said first end (27), said middle section (31) and the second end (29) of the second electro-mechanical feeder (5) form an enclosed space (33), and wherein the first end (27) of the second electro-mechanical feeder (5) has an opening (35), and wherein said opening (35) is covered by a second removable sealable lid (37), and a second metering wheel (24) that is located in the enclosed space (33), and wherein the second metering wheel (24) is rotatably driven by a second motor (18), and a second feeder tube (39) having a first end (41) and a second end (42) that is opposite to the first end (41) of the second feeder tube (39), and wherein the second end (29) of the second electro-mechanical feeder (5) is in communication with the first end (41) of the second feeder tube (39), a mixing hopper (43) that is located in juxtaposition to the first electro-mechanical feeder (3) and the second electro-mechanical feeder (5), and wherein the mixing hopper (43) has a first end (45) and a second end (47) that is opposite to the first end (45) of the mixing hopper, and a middle section (46) that is disposed between the first end (45) and the second end (47) of the mixing hopper (43), and wherein the mixing hopper (43) has a bottom plenum (49), and wherein the bottom plenum (49) of the mixing hopper (43) has a first inlet (800) and a second inlet (801) and an orifice (50) that is in communication with the first inlet (800) and the second inlet (801), and wherein the first feeder tube (19) is in communication with the first inlet (800) of the mixing hopper (43), and wherein the second feeder tube (39) is in communication with the second inlet (801) of the mixing hopper (43), such that the second end (22) of the first feeder tube (19) is in communication with the first inlet (800) of the first end (45) of the mixing hopper (43), and wherein the second end (42) of the second feeder tube (39) is in communication with the second inlet (801) of the first end (45) of the mixing hopper (43), a powder nozzle (51) having a first end (53) and a second end (55) that is opposite to the first end (53) of the powder nozzle (51) and a middle section (54) that is disposed between the first end (53) and the second end (55) of the powder nozzle (51), and wherein the first end (53) of the powder nozzle (51) is in communication with the orifice (50) of the bottom (49) of the mixing hopper (43), and wherein the second end (55) of the powder nozzle (51) has an orifice (52), and a combustion torch (60) having a first end (61) and a second end (63) that is opposite to the first end (61) of the combustion torch (60), and a middle section (65) that is disposed between the first end (61) and the second end (63) of the combustion torch (60), and a combustion chamber (67) located at the first end (61) of the combustion torch (60) and a tube port (69) located at the second end (63) of the combustion torch (60), wherein the tube port (69) has a first end (71) and a second end (73) that is opposite to the first end (71) of the tube port (69), and wherein the first end (71) of the tube port (69) is in communication with the combustion chamber (67) of the combustion torch (60) and wherein the second end (73) of the tube port (69) of the combustion torch (60) has an orifice (75), and whereon the orifice (75) of the second end (73) of the tube port (69) of the combustion torch (60) is in juxtaposition to the orifice (52) of the second end (55) of the powder nozzle (51). Optionally, the multi-component electro-mechanical flame spray deposition system of this invention, provides an inlet (not shown) into the mixing hopper (43) for gas pressurization of the mixing hopper (43) and the powder nozzle (51). Optionally, the mixing hopper has a filtered vent (44), FIG. 3B and FIG. 4. Optionally, the multi-component electro-mechanical flame spray deposition system of this invention, provides a first pressure release valve (not shown) on the first electro-mechanical feeder (3) and a second pressure relief valve (not shown) on the second electro-mechanical feeder (5).

Figure 6A:
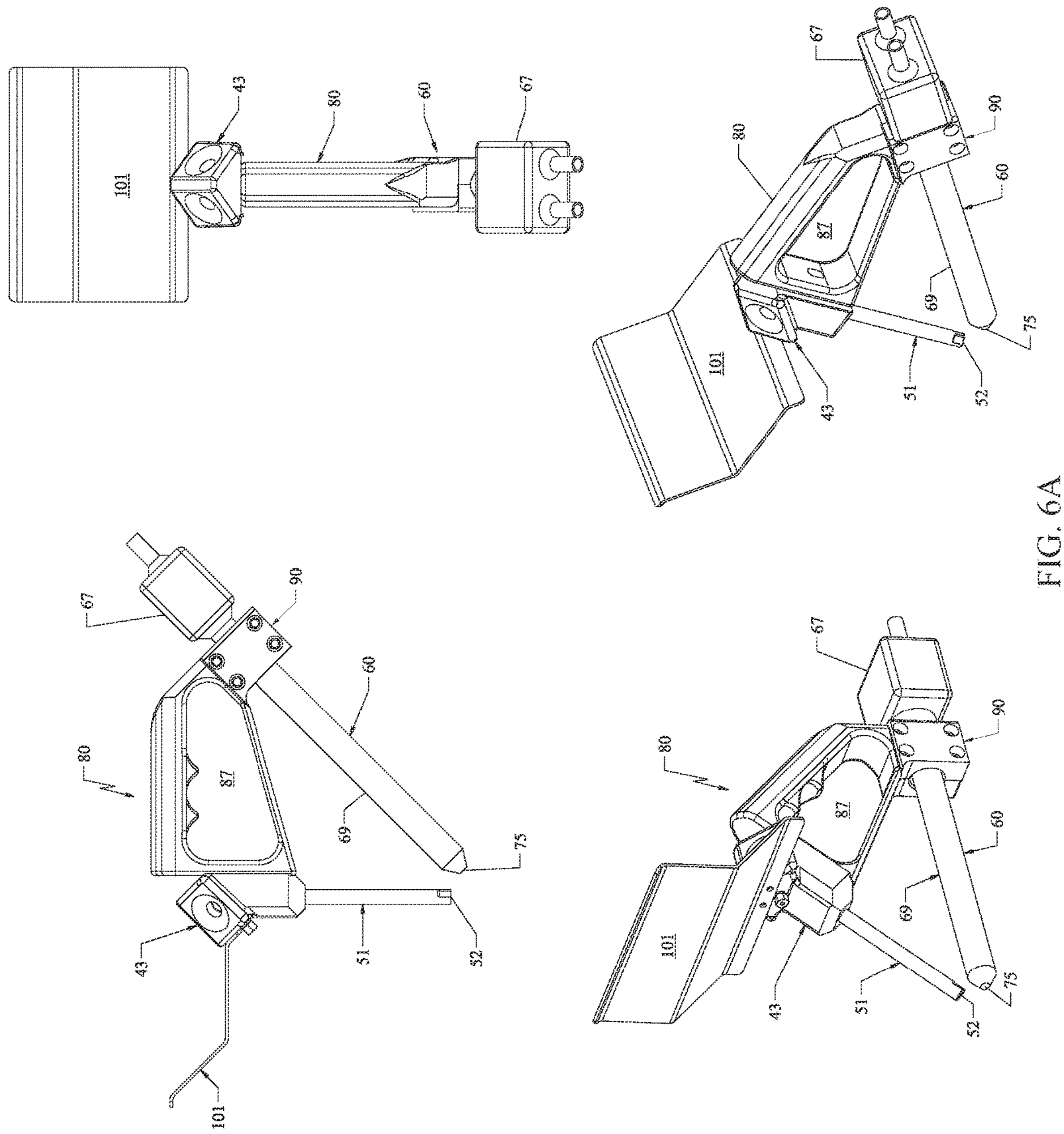
FIG. 6A shows on the top left a side view of the combustion torch, powder nozzle, and handle assembly with the clamp of this invention.

In certain embodiments of the multi-component electro-mechanical flame spray deposition system of this invention, as described herein, a handle assembly (80) is provided, FIG. 6. The handle assembly (80) has a first end (81) and a second end (83) that is located opposite the first end (81) of the handle assembly (80), and a middle section (85) that is disposed between the first end (81) and the second end (83) of the handle assembly (80). The middle section (85) of the handle assembly has an opening (87). The opening (87) has a dimension that will accommodate a human operator's fingers and/or hand. The first end (81) of the handle assembly (80) is attached to the middle section (46) of the mixing hopper (43) and the second end (83) of the handle assembly (80) is attached to the middle section (65) of the combustion torch (60). In certain embodiments, the first end (81) of the handle assembly (80) is rigidly attached to the middle section (46) of the mixing hopper (43) by a fastening bolt (700) and the second end (83) of the handle assembly (80) is attached to the middle section (65) of the combustion torch (60) by a clamp (90). In certain embodiments of this invention, a heat shield (101) is attached to said handle assembly (80), FIG. 6A.

As used herein, the term "juxtaposition to" means the state of being or placed close together or side by side.

In certain embodiments of this invention, the multi-component electro-mechanical flame spray deposition system of this invention, provides that the orifice (75) of the second end (73) of the tube port (69) of the combustion torch (60) is positioned at an oblique angle to the orifice (52) of the second end (55) of the powder nozzle (51). An oblique angle is an angle measured in degrees that is not a ninety degree angle. Preferably, the multi-component electro-mechanical flame spray deposition system of this invention, provides that the orifice (75) of the second end (73) of the tube port (69) of the combustion torch (60) is positioned at an acute angle to the orifice (52) of the second end (55) of the powder nozzle (51). In certain embodiments, the multi-component electro-mechanical flame spray deposition system of this invention, provides that the orifice (75) of the second end (73) of the tube port (69) of the combustion torch (60) is positioned at an oblique angle to the orifice (52) of the second end (55) of the powder nozzle (51) and that the tolerance gap between orifice (52) and orifice (75) ranges from about one eighth inch (⅛ in.) to about one inch (1 in.).

In certain embodiments of this invention, the multi-component electro-mechanical flame spray deposition system of this invention is mounted to a structure (200) (i.e. a cart) that is able to be moved from one location to another. In certain embodiments of this invention, the structure (200) has at least one set of wheels (201) and in certain embodiments of this invention the structure (200) has a first set of wheels (201) and a second set of wheels (202), FIG. 1A and FIG. 1B.

Figure 6B:
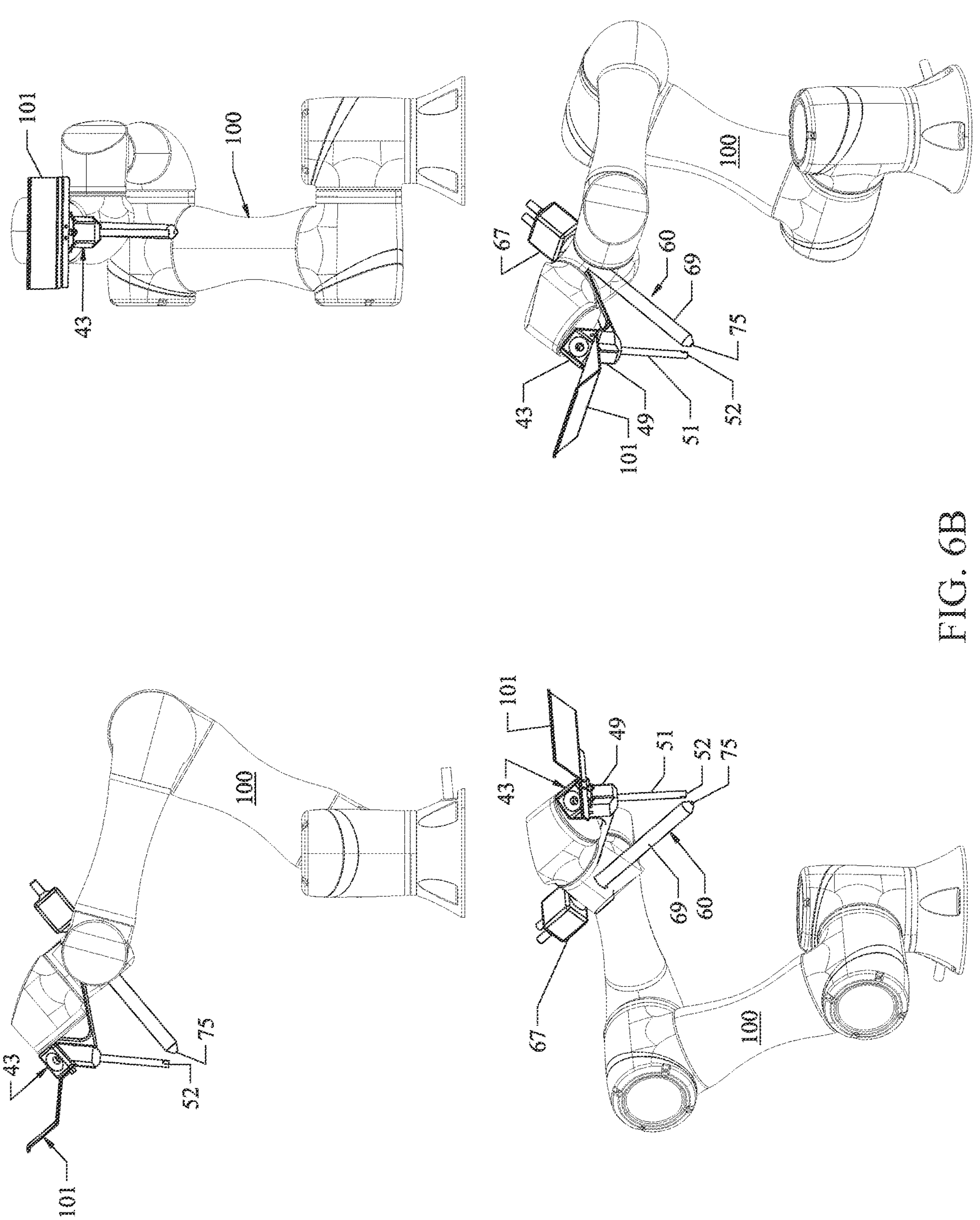
FIG. 6B shows on the top left a side view of the multi-positional gantry and the multi-component electro-mechanical flame spray deposition system of this invention.

In certain embodiments of this invention, the multi-component electro-mechanical flame spray deposition system of this invention is mounted to a multi-positional gantry (100), FIG. 6B. The multi-positional gantry (100) may be employed in an automated method to deposit coatings on articles of manufacture, such as for example, but not limited to steel drill bits.

In another embodiment a method of depositing substrates on and/or to articles of manufacture is provided, comprising providing a multi-component electro-mechanical flame spray deposition system, as described above, volumetrically dispensing from the first electro-mechanical feeder (3) and the second electro-mechanical feeder (5) constituents of hardfacing composite materials by activating the first metering wheel (4) by motor (8) and activating the second metering wheel (24) by motor (18), providing the flow of the constituent composite materials to flow through the first feeder tube (19) and the second feeder tube (39) and into the mixer hopper (43) and through the orifice (52) of the powder nozzle (55), providing a flame exiting through the orifice (75) of the tube port (69) of the combustion torch (60), and providing for said constituent composite materials exiting said orifice (52) of said second end (55) of said powder nozzle (51) to be entrained into the flame exciting the orifice (75) of the combustion torch (60) for forming a liquid constituent composite material, and depositing said liquid constituent composite material onto an article of manufacture. In certain embodiments, this method comprising wherein the constituent composite materials are in the form of powders. The powders are dispensed by the rotation of the first metering wheel and the second metering wheel with the aid of gravity and a carrier gas such as for example but not limited to argon. Preferably, the first metering wheel and the second metering wheel are each a knurled metering wheel. The quantity of powder dispensed is controlled by adjusting the current applied to the first motor and the second motor driving each of the first metering wheel and the second metering wheel, respectively. The motor may be for example but not limited to an electric motor powered by direct current or an alternating current, hydroelectric powered motor, or a pneumatic motor. Likewise, the composition of the coating that is being deposited upon an article of manufacture is controlled by independently adjusting the rotational velocity of the first and second metering wheels, and the feeding of the flame through the orifice (75) of the second end (73) of the combustion torch (60).

Figure 3A:
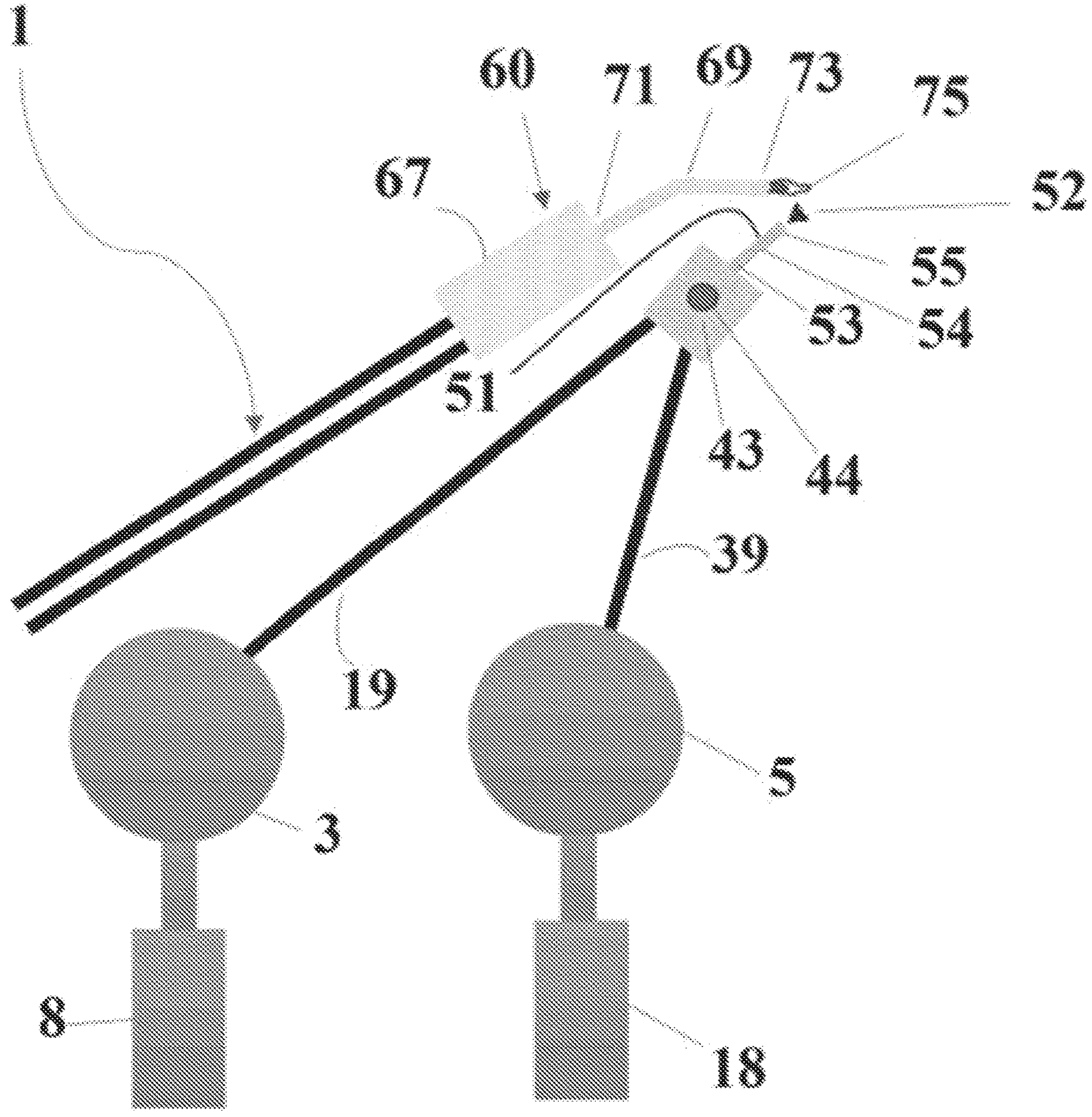
FIG. 3A shows a top view of a schematic of the multi-component electro-mechanical flame spray deposition system of this invention.
Figure 3B:
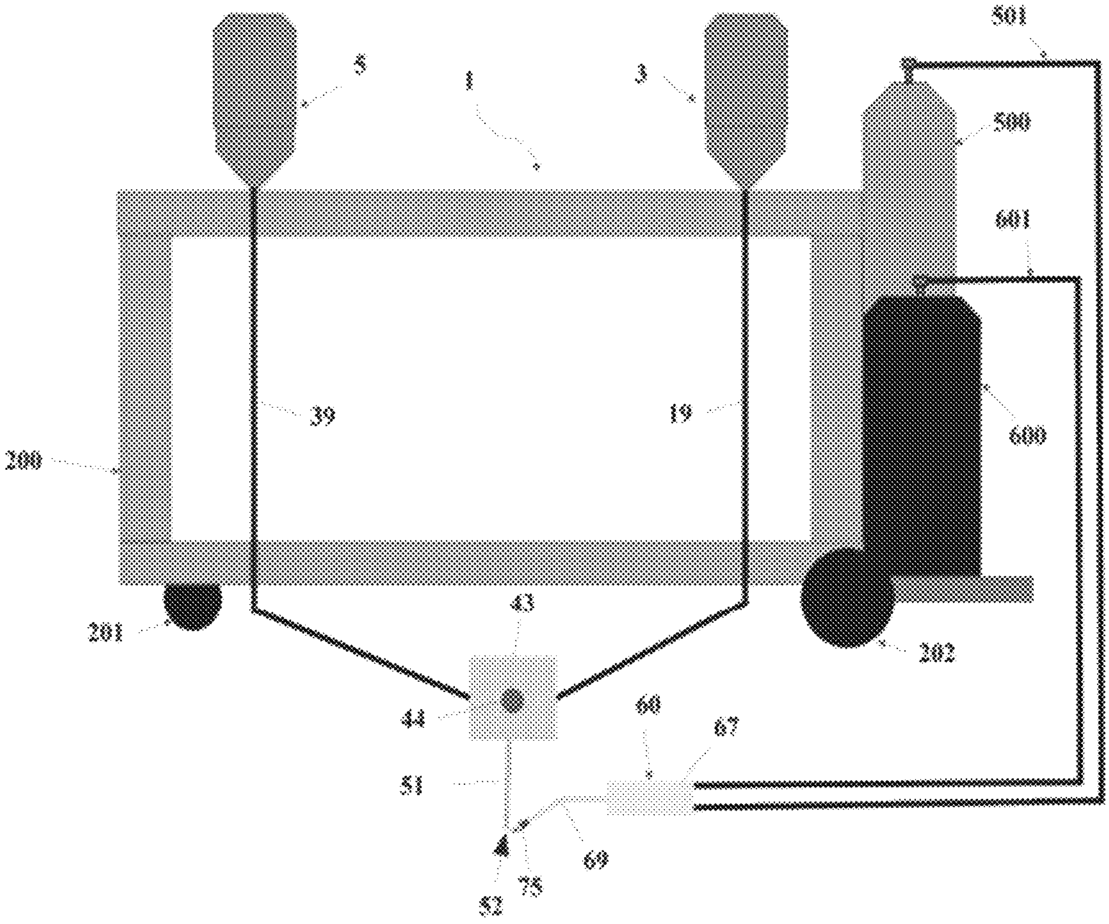
FIG. 3B shows a front view of a schematic of the multi-component electro-mechanical flame spray deposition system of this invention.
Figure 3C:
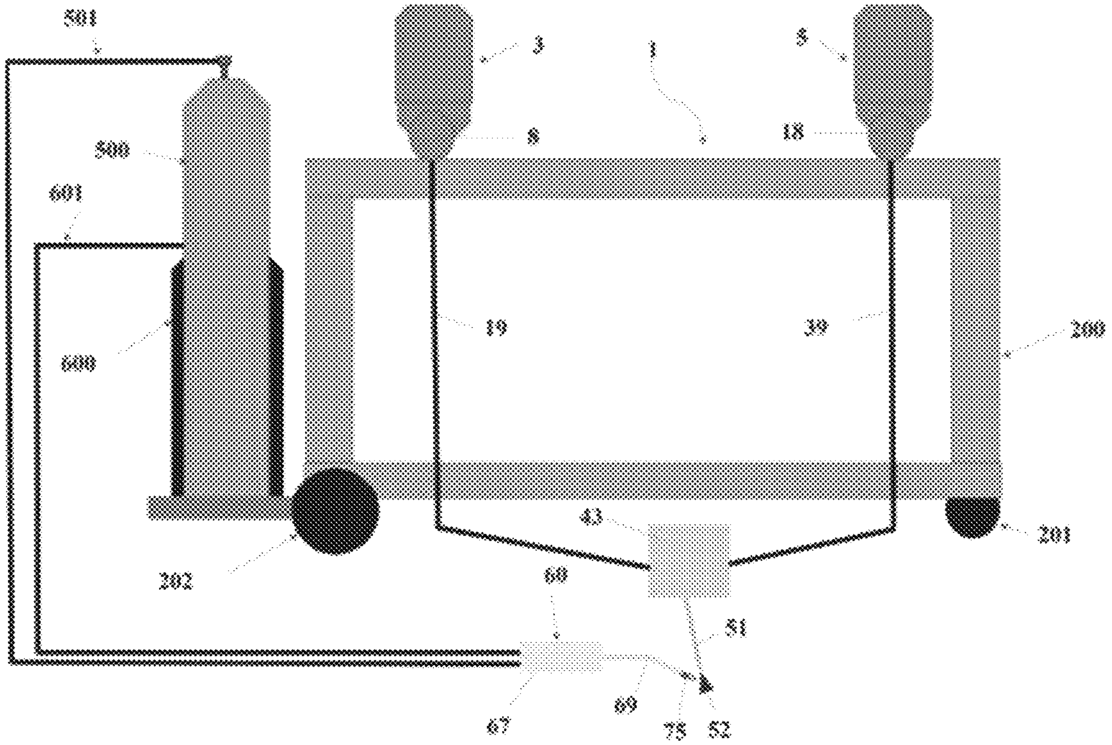
FIG. 3C shows a rear view of a schematic of the multi-component electro-mechanical flame spray deposition system of this invention.
Figure 4:
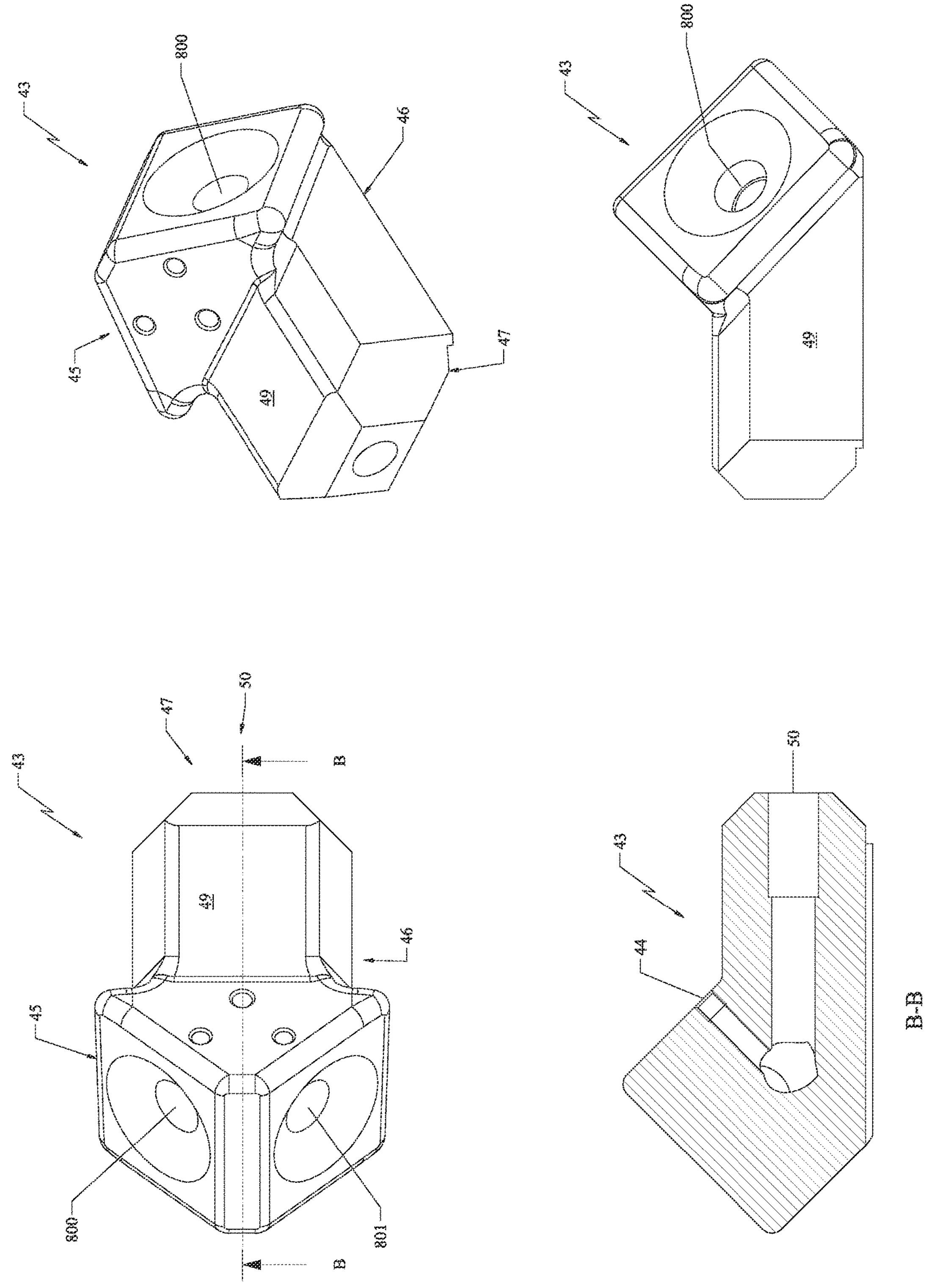
FIG. 4 shows on the top left a top view of the bottom plenum of the mixing hopper.
Figure 5:
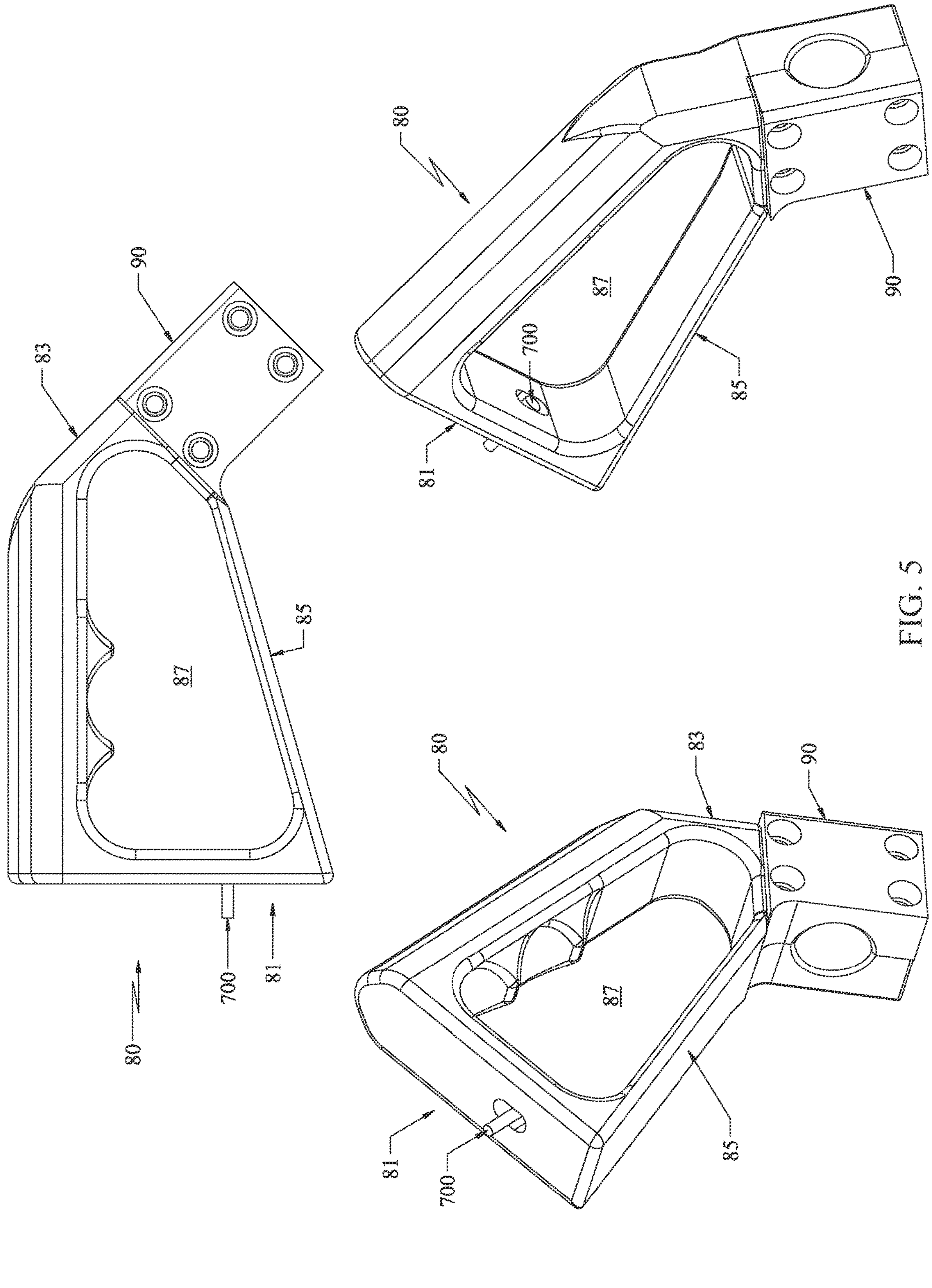
FIG. 5 shows on the top a side view of the handle assembly with clamp.

In certain embodiments of the methods of this invention, the conveyed powders are combined in the mixing hopper (43), FIG. 4. The mixing hopper (43) is integral to a handle assembly (80), FIG. 5. The handle assembly (80) via clamp (90) is clamped to a combustion torch (60), FIG. 6A. The combustion torch (60) produces thermal energy through the combustion of gases such as acetylene contained in a second tank (600) and an oxidizer such as compressed gaseous oxygen contained in a first tank (500). The first tank (500) is in communication with a first supply line (501) that is in communication with the combustion chamber (67) of the combustion torch (60) and the second tank (600) is in communication with a second supply line (602) that is in communication with the combustion chamber (67) of the combustion torch (60). The mixing hopper (43) vents excess carrier gas through a filtered vent (44) which prevents the egress of hardfacing powders. The hardfacing mixed powder (i.e. powder from the first electro-mechanical feeder (3) and powder from the second electro-mechanical feeder (5)) exits the mixing hopper (43) into the powder nozzle (51) under the influence of gravity and may also include the optional carrier gas. In certain embodiments of the method of this invention, the mixed powder is introduced to a combustion flame (formed from the combination of the acetylene gas from the second tank (600) and oxygen from the first tank (500) in the combustion chamber (67) of the combustion torch (60)) exiting the orifice (75) of the second end (73) of the combustion torch (60) at an oblique angle, FIGS. 3A, 3B, and 3C. The mixed powder stream and the combustion flame intersect at a preheated substrate (i.e. article of manufacture or work piece) to which the hardfacing (i.e. coating) is applied. The thermal energy from the pre-heated substrate and the combustion flame melts the nickel or cobalt based alloys of the mixed powder which then provide a densified matrix for wear resistant particles such as tungsten carbide.

In certain embodiment of the methods of this invention, to prevent segregation, hardfacing constituents are sorted by particle size of the constituent composite materials or powders in each of the first electro-mechanical feeder and the second electro-mechanical feeder. In certain embodiments of this invention, each of the first electro-mechanical feeder and the second electro-mechanical feeder are mounted together on a structure (200) (for example but not limited to a frame or cart), and wherein a regulated carrier gas, for example but not limited to at 40 psi, is provided as shown in FIG. 3A, FIG. 3B, and FIG. 3C. Large particles (>200 micrometers) of the dense materials such as tungsten carbide are dispensed from one of the two electro-mechanical feeders, either the first electro-mechanical feeder (3) or the second electro-mechanical feeder (5). The first electro-mechanical feeder (3) is capable of dispensing particles from 200 micrometers to 600 micrometers in diameter. The second electro-mechanical feeder (5) dispenses fine particles which consist of a nickel or cobalt based alloy which may be mixed with carbides such as tungsten carbide. The fine particles are less than 200 micrometers in diameter. In certain embodiments of this invention, the combined output of the first and second electro-mechanical feeders is a maximum of 100 g/min (gram/minute). After the alloy and carbide powders are dispensed, the large and fine particles are conveyed to the mixing hopper (43) in the first feeder tube (19) and the second feeder tube (39) (preferably made of polymer tubing). In certain embodiments of this invention, the first and second feeder tubes have a length of from one foot to greater than 12 feet in length. The powders are carried by a carrier gas such as argon through the first and second feeder tubes (19, and 39), respectively. Due to the influence of the carrier gas, the powders in the feeder tubes (19, 39) are capable of flowing both uphill and downhill. The feeder tubes (19, 39) may be manipulated to a plurality of angles and positions to facilitate hardfacing deposition.

In certain other embodiments of the multi-component electro-mechanical flame spray deposition system of this invention, as described herein, comprising a first electro-mechanical feeder and a second electro-mechanical feeder, each of said first electro-mechanical feeder and said second electro-mechanical feeder is in communication with a mixing hopper, and wherein said mixing hopper is in communication with a powder nozzle having an orifice, and a combustion torch having an orifice, wherein said orifice of said powder nozzle is in juxtaposition to said orifice of said combustion torch, and wherein the second electro-mechanical feeder is substituted by a feeder that is selected from one of the group consisting of a gravity feeder and a gas injection feeder. In this embodiment of the invention, those persons of ordinary skill in the art will understand that the multi-component electro-mechanical flame spray deposition system requires at least one first electro-mechanical feeder and at least one feeder that is a gravity feeder or a gas injection feeder. Thus, this embodiment of the multi-component electro-mechanical flame spray deposition system of this invention requires in its most basic form one electro-mechanical feeder in combination with either a gravity feeder or a gas injection feeder. The substitution of the second electro-mechanical feeder with either a gravity feeder or a gas injection feeder may be applied across any of the other embodiments of the multi-component electro-mechanical flame spray deposition system of this invention as set forth in other paragraphs of this application.

As used herein, “including,” “containing” and like terms are understood in the context of this application to be synonymous with “comprising” and are therefore open-ended and do not exclude the presence of additional undescribed or unrecited elements, materials, phases or method steps. As used herein, “consisting of” is understood in the context of this application to exclude the presence of any unspecified element, material, phase or method step. As used herein, “consisting essentially of” is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term “about”. Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of “1 to 10” is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of “or” means “and/or” unless specifically stated otherwise, even though “and/or” may be explicitly used in certain instances. In this application, the articles “a,” “an,” and “the” include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A multi-component electro-mechanical flame spray deposition system comprising a first electro-mechanical feeder and a second electro-mechanical feeder, wherein said first electro-mechanical feeder has a first electro-mechanical feeder enclosed space and a first electro-mechanical feeder opening, and wherein said first electro-mechanical feeder opening is covered by a first removable sealable lid, and a first metering wheel located in said first electro-mechanical feeder enclosed space, and wherein said first metering wheel is rotatably driven by a first motor, and a first feeder tube and wherein said first electro-mechanical feeder is in communication with said first feeder tube, and wherein said second electro-mechanical feeder has a second electromechanical feeder enclosed space and a second electro-mechanical feeder opening, and wherein said second electro-mechanical feeder opening is covered by a second removable sealable lid, and a second metering wheel that is located in said second electro-mechanical feeder enclosed space, and wherein the second metering wheel is rotatably driven by a second motor, and a second feeder tube and wherein the second electro-mechanical feeder is in communication with the second feeder tube, a mixing hopper that is located in juxtaposition to said first electro-mechanical feeder and said second electro-mechanical feeder, and wherein said mixing hopper has a bottom plenum, and wherein said bottom plenum of said mixing hopper has an orifice, and wherein said first feeder tube is in communication with said mixing hopper, and wherein said second feeder tube is in communication with said mixing hopper, a powder nozzle and wherein said powder nozzle is in communication with said orifice of said bottom plenum of said mixing hopper, and wherein said powder nozzle has an orifice, and a combustion torch having a combustion chamber and a tube port wherein said tube port is in communication with said combustion chamber of said combustion torch, and wherein said tube port of said combustion torch has an orifice, and whereon said orifice of said tube port of the combustion torch is in juxtaposition to said orifice of said powder nozzle.

2. The multicomponent electro-mechanical flame spray deposition system of claim 1 wherein said orifice of said tube port of said combustion torch is positioned at an oblique angle to said orifice of said powder nozzle.

3. The multi-component electro-mechanical flame spray deposition system of claim 2 wherein said orifice of said tube port of said combustion torch is positioned at an acute angle to said orifice of said powder nozzle.

4. The multi-component electro-mechanical flame spray deposition system of claim 2 wherein there is a tolerance gap between said orifice of said powder nozzle and said orifice of said tube port of said combustion torch that ranges from about one eighth inch to about one inch.

5. A multi-component electro-mechanical flame spray deposition system comprising a first electro-mechanical feeder and a second electro-mechanical feeder, wherein said first electro-mechanical feeder has a first end and a second end that is opposite to said first end, and a middle section that is disposed between said first end and said second end of said first electro-mechanical feeder, and wherein said first end, said middle section, and said second end form a first electro-mechanical feeder enclosed space, and wherein said first end of said electro-mechanical feeder has an opening, and wherein said opening of said first end of said electro-mechanical feeder is covered by a first removable sealable lid, and a first metering wheel located in said first electro-mechanical feeder enclosed space, and wherein said first metering wheel is rotatably driven by a first motor, and a first feeder tube having a first end and a second end that is opposite to the first end of said first feeder tube, and wherein said second end of the first electro-mechanical feeder is in communication with said first end of said first feeder tube, and wherein said second electro-mechanical feeder has a first end and a second end that is opposite to said first end of said second electro-mechanical feeder, and a middle section that is disposed between said first end and said second end of said second electro-mechanical feeder, and wherein said first end, said middle section, and said second end of said second electro-mechanical feeder form a second electro-mechanical feeder enclosed space, and wherein said first end of said second electro-mechanical feeder has an opening, and wherein said opening of said second end of said second electro-mechanical feeder is covered by a second removable sealable lid, and a second metering wheel that is located in said second electro-mechanical feeder enclosed space, and wherein said second metering wheel is rotatably driven by a second motor, and a second feeder tube having a first end and a second end that is opposite to said first end of said second feeder tube, and wherein said second end of said second electro-mechanical feeder is in communication with said first end of said second feeder tube, a mixing hopper that is located in juxtaposition to said first electro-mechanical feeder and said second electro-mechanical feeder, and wherein said mixing hopper has a first end and a second end that is opposite to the first end of said mixing hopper, and a middle section that is disposed between said first end and said second end of said mixing hopper, and wherein said mixing hopper has a bottom plenum, and wherein said bottom plenum of said mixing hopper has an orifice, and wherein said second end of said first feeder tube is in communication with said first end of said mixing hopper, and wherein said second end of said second feeder tube is in communication with said second end of said mixing hopper, a powder nozzle having a first end and a second end that is opposite to the first end of the powder nozzle and a middle section that is disposed between said first end and said second end of said powder nozzle, and wherein said first end of said powder nozzle is in communication with said orifice of said bottom plenum of said mixing hopper, and wherein said second end of said powder nozzle has an orifice, and a combustion torch having a first end and a second end that is opposite to said first end of said combustion torch, and a middle section that is disposed between said first end and said second end of said combustion torch, and a combustion chamber located at said first end of said combustion torch and a tube port located at said second end of said combustion torch, wherein said tube port has a first end and a second end that is opposite to said first end of said tube port, and wherein said first end of said tube port is in communication with said combustion chamber of said combustion torch and wherein said second end of said tube port of said combustion torch has an orifice, and wherein said orifice of said second end of said tube port of said combustion torch is in juxtaposition to said orifice of said second end of said powder nozzle.

6. The multi-component electro-mechanical flame spray deposition system of claim 5 including an inlet positioned into said mixing hopper for gas pressurization of said mixing hopper and said powder nozzle.

7. The multi-component electro-mechanical flame spray deposition system of claim 5 including a first pressure release valve positioned on said first electro-mechanical feeder and a second pressure relief valve positioned on said second electro-mechanical feeder.

8. The multi-component electro-mechanical flame spray deposition system of claim 5 including wherein said orifice of said second end of the said port of said combustion torch is positioned at an oblique angle to said orifice of said second end of said powder nozzle.

9. The multi-component electro-mechanical flame spray deposition system of claim 5 wherein said orifice of said second end of said tube port of said combustion torch is positioned at an acute angle to said orifice of said second end of said powder nozzle.

10. The multi-component electro-mechanical flame spray deposition system of claim 5 wherein a tolerance gap of from about one eighth inch to about one inch is present between said orifice of said second end of said tube port of said combustion torch and said orifice of said second end of said powder nozzle.

11. The multi-component electro-mechanical flame spray deposition system of claim 5 including a handle assembly comprising a first end and a second end that is located opposite said first end of said handle assembly, and a middle section that is disposed between said first end and said second end of said handle assembly, and wherein said middle section of said handle assembly has an opening, and wherein said first end of said handle assembly is attached to said middle section of said mixing hopper and said second end of said handle assembly is attached to said middle section of said combustion torch.

12. The multi-component electro-mechanical flame spray deposition system of claim 11 including wherein said first end of said handle assembly is rigidly attached to said middle section of said mixing hopper by a fastening bolt and said second end of said handle assembly is attached to said middle section of said combustion torch by a clamp.

13. The multi-component electro-mechanical flame spray deposition system of claim 5 including wherein said multi-component electro-mechanical flame spray deposition system is mounted to a multi-positional gantry.

14. The multi-component electro-mechanical flame spray deposition system of claim 13 wherein said multi-positional gantry is employed in an automated method to deposit coatings on articles of manufacture.

15. A multi-component spray deposition system comprising a first feeder and a second feeder, said feeder selected from the group consisting of a electro-mechanical feeder, gravity feeder and a gas injection feeder, a first metering wheel located within said first feeder, a first feeder tube and wherein said first feeder is in communication with said first feeder tube, and wherein said second feeder, a second metering wheel that is located within said second feeder, a second feeder tube and wherein the second feeder is in communication with the second feeder tube, a mixing hopper that is located in juxtaposition to said first feeder and said second feeder, and wherein said mixing hopper has a bottom plenum, and wherein said bottom plenum of said mixing hopper has an orifice, and wherein said first feeder tube is in communication with said mixing hopper, and wherein said second feeder tube is in communication with said mixing hopper, a powder nozzle and wherein said powder nozzle is in communication with said orifice of said bottom plenum of said mixing hopper, and wherein said powder nozzle has an orifice, and a combustion torch having a combustion chamber and a tube port wherein said tube port is in communication with said combustion chamber of said combustion torch, and wherein said tube port of said combustion torch has an orifice, and wherein said orifice of said tube port of the combustion torch is in juxtaposition to said orifice of said powder nozzle.

* * * * *